US009811168B2

(12) United States Patent
Zhang

(10) Patent No.: US 9,811,168 B2
(45) Date of Patent: Nov. 7, 2017

(54) APPARATUS FOR PERFORMING GESTURE RECOGNITION AND CONTROL BASED ON ULTRASONIC POSITIONING

(71) Applicant: Xiaoyu Zhang, Shenzhen (CN)

(72) Inventor: Xiaoyu Zhang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 91 days.

(21) Appl. No.: 15/004,975

(22) Filed: Jan. 24, 2016

(65) Prior Publication Data

US 2016/0364006 A1 Dec. 15, 2016

(30) Foreign Application Priority Data

Jun. 10, 2015 (CN) .......................... 2015 1 0315444

(51) Int. Cl.
G06F 3/01 (2006.01)
G06F 3/043 (2006.01)

(52) U.S. Cl.
CPC .............. G06F 3/017 (2013.01); G06F 3/043 (2013.01)

(58) Field of Classification Search
CPC combination set(s) only.
See application file for complete search history.

(56) References Cited

U.S. PATENT DOCUMENTS

| 9,033,516 | B2* | 5/2015 | Marti | H04N 9/3185 353/121 |
| 2007/0033012 | A1* | 2/2007 | Rosenberg | G06F 3/0346 704/206 |
| 2015/0023138 | A1* | 1/2015 | Liu | G01S 15/876 367/124 |
| 2015/0103018 | A1* | 4/2015 | Kamin-Lyndgaard | G09G 5/006 345/173 |
| 2015/0249819 | A1* | 9/2015 | Jiang | G06F 3/0386 345/419 |
| 2015/0261350 | A1* | 9/2015 | Lee | G06F 3/044 345/174 |

* cited by examiner

Primary Examiner — Van Chow
(74) Attorney, Agent, or Firm — Na Xu; IPro, PLLC

(57) ABSTRACT

An apparatus for performing gesture recognition and control based on ultrasonic positioning is disclosed. The apparatus includes an ultrasonic transmitter module for providing an original ultrasonic signal; an ultrasonic receiver for receiving a reflected ultrasonic signal corresponding to the original ultrasonic signal; a computing module for computing a frequency shift within a time period from the original ultrasonic signal being transmitted to the reflected ultrasonic signal being received, and converting the frequency shift into a gesture characteristic signal; a gesture database for providing reference gesture characteristic signals, and control signals corresponding to the reference gesture characteristic signals respectively; and a gesture recognition and control module for comparing the gesture characteristic signal with the reference gesture characteristic signals in the gesture database, and selecting a corresponding control signal from the data base according to a comparison result.

18 Claims, 2 Drawing Sheets

APPARATUS FOR PERFORMING GESTURE RECOGNITION AND CONTROL BASED ON ULTRASONIC POSITIONING

FIELD OF THE DISCLOSURE

The present disclosure generally relates to gesture recognition technologies, and more particularly, to an apparatus for performing gesture recognition and control based on ultrasonic positioning.

BACKGROUND

Gesture recognition technique enables humans to communicate and interact with machines by human gestures. Using the gesture recognition, it is possible to put a hand or point a finger at a computer screen so that a cursor on the computer can move in accordance with movement of the hand or finger.

A typical approach to gesture recognition is using cameras to catch human's gesture and using computer vision software algorithms to interpret the corresponding gesture language. However, the above-mentioned gesture recognition approach has a slow response speed due to camera operation; and moreover, the camera operation also has a higher requirement on environment brightness, in other words, the gesture recognition may be unusable in a dark environment.

Therefore, it is desired to provide a new gesture recognition apparatus which can overcome the aforesaid problems.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and the embodiment thereof.

Figure 1:
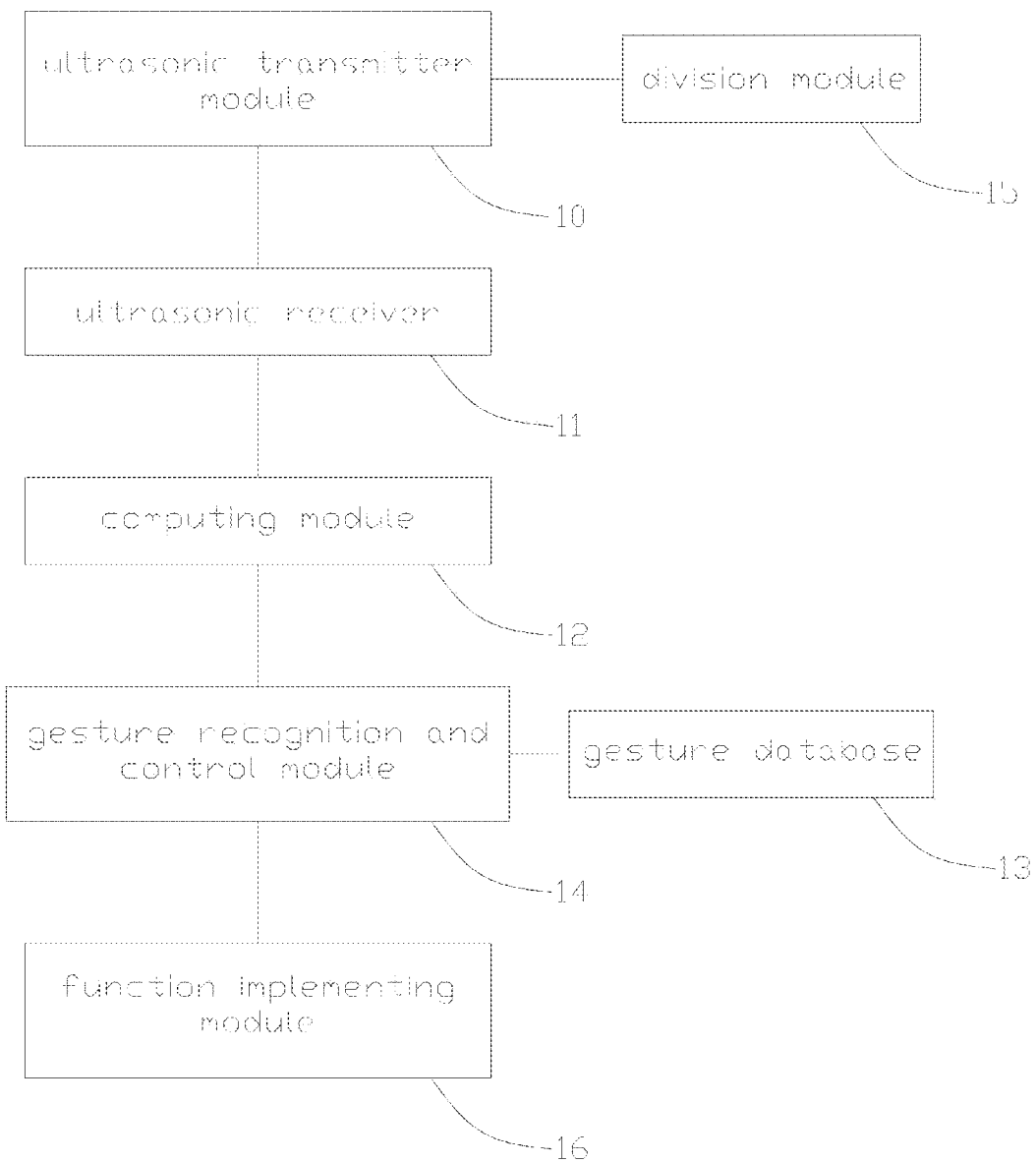
FIG. 1 is a block diagram of an apparatus for performing gesture recognition and control based on ultrasonic positioning according to an exemplary embodiment of the present disclosure.

Referring to FIG. 1, an apparatus 1 for performing gesture recognition and control based on ultrasonic positioning is shown. The apparatus 1 may be applied in an electronic device, and includes an ultrasonic transmitter module 10, an ultrasonic receiver 11, a computing module 15, a gesture database 13, a gesture recognition and control module 14, and a function implementing module 16.

The ultrasonic transmitter module 10 may include one or more ultrasonic transmitter, which is configured to provide an original ultrasonic signal. The original ultrasonic signal may be transmitted to a human hand or other target objects, and then be reflected by the human hand to generate a reflected ultrasonic signal. The ultrasonic receiver 11 is configured to receive the reflected ultrasonic signal.

The computing module 12 is configured for computing a frequency shift (namely, Doppler shift), within a time period from the original ultrasonic signal being transmitted by the ultrasonic transmitter module 10 to the reflected ultrasonic signal being received by the ultrasonic receiver 11, and converting the frequency shift into a corresponding gesture characteristic signal, and then output the gesture characteristic signal to the gesture recognition and control module 14.

The gesture database 13 includes a plurality of preset reference gesture characteristic signals, and the gesture database 13 may also provide control signals for controlling the function implementing module 16 to implement certain functions in the electronic device. Each of the control signals corresponds to a respective reference gesture characteristic signal, in other words, the reference gesture characteristic signals and the control signals have a preconfigured mapping relationship; based on a certain reference gesture characteristic signal, a corresponding control signal can be selected or looked up from the gesture database 13 according to the preconfigured mapping relationship.

The gesture recognition and control module 14 is connected between the computing module 12 and the gesture database 13, the gesture recognition and control module 14 may receive the gesture characteristic signal outputted by the computing module 12, and compare the gesture characteristic signal with the reference gesture characteristic signals in the gesture database 13; when the gesture recognition and control module 14 finds a reference gesture characteristic signal in the gesture database 13 matches the gesture characteristic signal outputted by the computing module 12, the gesture recognition and control module 14 may further look up a corresponding control signal in the gesture database 13, and then output the control signal to the function implementing module 16.

The function implementing module 16 is configured to implement certain functions in the electronic device according to the control signal. These functions may for example be image scaling, function selection, function confirmation, cursor movement, opening page, closing page closing, or the like.

In a preferred embodiment, the apparatus 1 may further include a division module 15; the division module 15 is configured to divide the original ultrasonic signal transmitted by the ultrasonic transmitter into several ultrasonic frames based on a time division manner. Specifically, an ultrasonic signal transmitting time of the ultrasonic transmitter can be divided into several time slots, each of the ultrasonic frames corresponds to a respective time slot, and accordingly, the ultrasonic frames cooperatively constitute the ultrasonic signal transmitted by the ultrasonic transmitter.

Upon the condition that the division module 15 is included in the apparatus 1, the frequency shift computing operation of the computing module 12 is also performed based on the ultrasonic frames. In detail, the computing module 12 computes a frequency shift within a time period from an ultrasonic frame being transmitted by the ultrasonic transmitter module to the reflected ultrasonic frame being received by the ultrasonic receiver 11, and converting the frequency shift into a corresponding gesture characteristic signal.

Typically, the number of ultrasonic transmitter in the ultrasonic transmitter 10 can be selected according to the required ultrasonic positioning accuracy; the more ultrasonic transmitters are used, the better positioning accuracy can be obtained. To obtain a good ultrasonic positioning accuracy, preferably, at least two ultrasonic transmitters included in the apparatus 1; for example, in the illustrated embodiment, four ultrasonic transmitters are adapted in the ultrasonic transmitter module 10, the four ultrasonic transmitters are disposed in different positions, and the ultrasonic receiver 11 may be disposed at a central region of the four ultrasonic transmitters.

Moreover, each of the ultrasonic transmitters may preferably transmit original ultrasonic signals with a different frequency from other ultrasonic transmitters, so that the reflected ultrasonic signals received by the ultrasonic receiver 11 may be distinguished; and accordingly, the computing module 12 may compute frequency shifts of the original ultrasonic signals outputted by different ultrasonic transmitters, and obtain several gesture characteristic signals.

Figure 2:
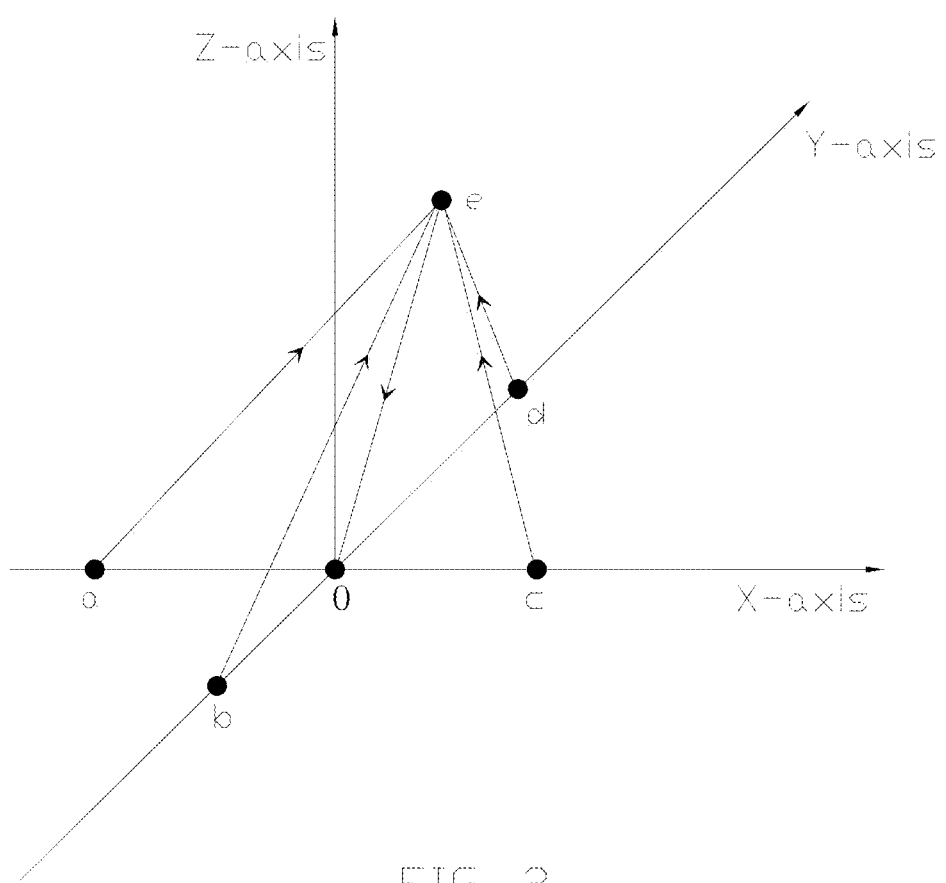
FIG. 2 schematically illustrates an operation of the ultrasonic transmitters and the ultrasonic receiver of the apparatus in FIG. 1.

FIG. 2 schematically illustrates an operation of the ultrasonic transmitters and the ultrasonic receiver of the apparatus in FIG. 1. As illustrated in FIG. 2, a reference coordinate is provided, and the four ultrasonic transmitters of the ultrasonic transmitter module 10 are respectively disposed at position a, position b, position c and position d in the reference coordinate, when position a is at a negative X-axis, position b is at a negative Y-axis, position c is at a positive Y-axis, and position d is at a positive Y-axis; moreover, the ultrasonic receiver 11 is disposed at an origin point O of the reference coordinate. A human hand or other target object, which is labeled as e in FIG. 2, may be moved in the reference coordinate, original ultrasonic signals provided by the four ultrasonic transmitters at positions a-d are transmitted to the human hand e, and then are reflected to the ultrasonic receiver 11 at origin point O by the human hand e; thereafter, the computing module 12 can compute frequency shifts of the reflected ultrasonic signals by the human hand E in compare with the original ultrasonic signals of the four ultrasonic transmitters at positions a-d, and recognize a corresponding gesture.

The apparatus as provided in the present disclosure utilizes the frequency shifts of ultrasonic signals which is reflected by human hand to recognize the gesture language, because the ultrasonic signals have high directionality, the gesture recognition and control can be more accurate, and utilization of ultrasonic signals can also improve a gesture recognition speed. Furthermore, the transmission of ultrasonic signals does not rely on environment light, thus the gesture recognition of the apparatus in the present disclosure is still operational even in a dark environment.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for performing gesture recognition and control based on ultrasonic positioning, comprising:
   an ultrasonic transmitter module for providing an original ultrasonic signal;
   an ultrasonic receiver for receiving an reflected ultrasonic signal corresponding to the original ultrasonic signal;
   a computing module for computing a frequency shift within a time period from the original ultrasonic signal being transmitted to the reflected ultrasonic signal being received, and converting the frequency shift into a gesture characteristic signal;
   a gesture database for providing reference gesture characteristic signals, and control signals corresponding to the reference gesture characteristic signals respectively; and
   a gesture recognition and control module for comparing the gesture characteristic signal with the reference gesture characteristic signals in the gesture database, and selecting a corresponding control signal from the data base according to a comparison result;
   a division module for dividing the original ultrasonic signal transmitted by the ultrasonic transmitter module into several ultrasonic frames based on a time division manner.

2. The apparatus of claim 1, further comprising a function implementing module for implementing functions in an electronic device in which the apparatus is applied according to the control signal.

3. The apparatus of claim 1, wherein the computing module computes the frequency shift within a time period from an ultrasonic frame being transmitted to a corresponding reflected ultrasonic frame being received.

4. The apparatus of claim 1, wherein the ultrasonic transmitter module comprises at least two ultrasonic transmitters, each of the at least two ultrasonic transmitters is configured for transmitting an original ultrasonic signal with a predetermined frequency.

5. The apparatus of claim 4, wherein a frequency of the original ultrasonic signal transmitted by each of the at least two ultrasonic transmitters is different from other ultrasonic transmitters.

6. The apparatus of claim 4, wherein the ultrasonic transmitter module comprises four ultrasonic transmitters disposed at different positions, and the ultrasonic receiver is disposed at a central region of the four ultrasonic transmitters.

7. The apparatus of claim 6, wherein the four ultrasonic transmitters are disposed at a negative X-axis, a negative Y-axis, a positive Y-axis, and a positive Y-axis of a reference coordinate respectively, and the ultrasonic receiver is disposed at an origin point of the reference coordinate.

8. The apparatus of claim 1, wherein the reference gesture characteristic signals and the control signals in the gesture database have a preconfigured mapping relationship.

9. The apparatus of claim 8, wherein when the gesture recognition and control module finds a reference gesture characteristic signal in the gesture database matches the gesture characteristic signal outputted by the computing module, the gesture recognition and control module looks up a control signal corresponding to the reference gesture characteristic signal in the gesture database and then outputs the control signal.

10. A gesture recognition apparatus, comprising:
    an ultrasonic transmitter for providing an original ultrasonic signal;
    an ultrasonic receiver for receiving an reflected ultrasonic signal generated due to reflection of the original ultrasonic signal on a target object;
    a computing module for computing a frequency shift between the reflected ultrasonic signal and the original ultrasonic signal, and interpreting the frequency shift into a gesture characteristic signal;
    a gesture recognition and control module for recognizing the gesture characteristic signal and selecting a control signal corresponding to the gesture characteristic signal;

a division module for dividing the original ultrasonic signal transmitted by the ultrasonic transmitter into several ultrasonic frames based on a time division manner.

11. The gesture recognition apparatus of claim 10, further comprising a gesture database for providing reference gesture characteristic signals, and control signals corresponding to the reference gesture characteristic signals respectively.

12. The gesture recognition apparatus of claim 11, wherein the gesture recognition and control module recognizes the gesture characteristic signal by comparing the gesture characteristic signal with the reference gesture characteristic signals in the gesture database.

13. The gesture recognition apparatus of claim 12, wherein the reference gesture characteristic signals and the control signals in the gesture database have a preconfigured mapping relationship.

14. The gesture recognition apparatus of claim 13, wherein when the gesture recognition and control module finds a reference gesture characteristic signal in the gesture database matches the gesture characteristic signal outputted by the computing module, the gesture recognition and control module looks up a control signal corresponding to the reference gesture characteristic signal in the gesture database and then outputs the control signal.

15. The gesture recognition apparatus of claim 10, further comprising a function implementing module for implementing functions in an electronic device in which the apparatus is applied according to the control signal.

16. The gesture recognition apparatus of claim 10, wherein the computing module computes the frequency shift within a time period from an ultrasonic frame being transmitted to a corresponding reflected ultrasonic frame being received.

17. The gesture recognition apparatus of claim 10, further comprising other ultrasonic transmitters for providing original ultrasonic signals with different frequencies.

18. The gesture recognition apparatus of claim 17, wherein the gesture recognition apparatus comprises four ultrasonic transmitters disposed at different positions, and the ultrasonic receiver is disposed at a central region of the four ultrasonic transmitters.

\* \* \* \* \*